INVENTORS W. W. CARPENTER
E. VROOM
BY
ATTORNEY

Oct. 23, 1951 W. W. CARPENTER ET AL 2,572,699
CHARGE AND TAX DETERMINING EQUIPMENT FOR TELEPHONE SYSTEMS
Filed July 28, 1949 7 Sheets-Sheet 3

INVENTORS W. W. CARPENTER
E. VROOM
BY
ATTORNEY

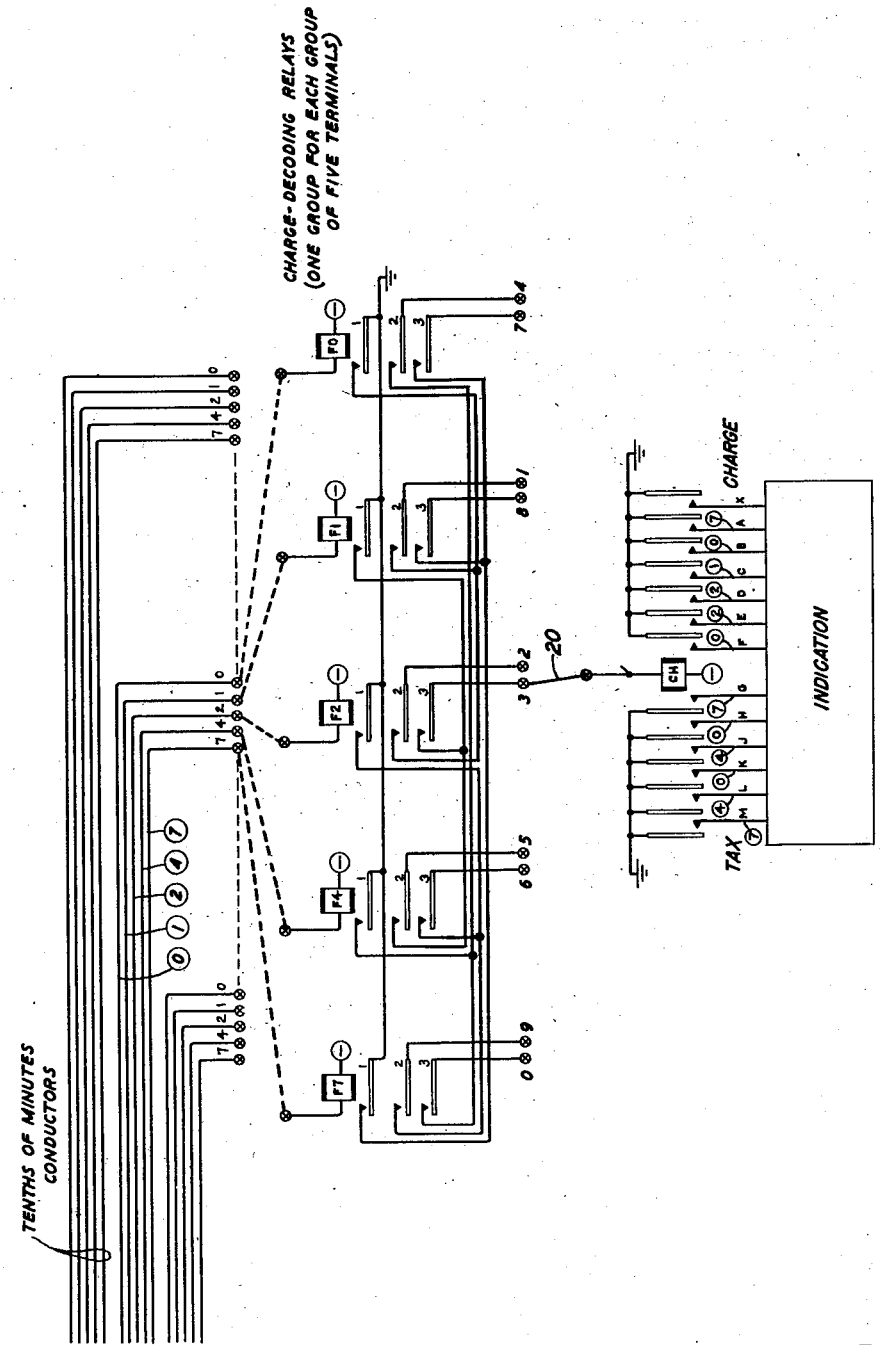

Patented Oct. 23, 1951

2,572,699

UNITED STATES PATENT OFFICE 2,572,699

CHARGE AND TAX DETERMINING EQUIPMENT FOR TELEPHONE SYSTEMS

Warren W. Carpenter, Forest Hills, and Edward Vroom, Ossining, N. Y., assignors to Bell Telephone Laboratories, Incorporated, New York, N. Y., a corporation of New York Application July 28, 1949, Serial No. 107,198

1 Claim. (Cl. 235—61)

This invention relates to price determining systems and more particularly to an apparatus by means of which the charge and tax for a transaction are automatically determined from items of information pertaining to the transaction.

Automatic devices for the computation of sale prices, or charges, from data relating to the goods or services for which the prices or charges are to be determined, have long been known. The prevalence at the present time, however, of imposts such as sales taxes, luxury taxes and other types of taxes, makes it desirable to provide means for automatically determining, at the same time, the tax to be imposed on each price or charge. Heretofore, these taxes have been computed mentally or from prepared tables; but the taxes, while depending upon the different prices or charges, are often not directly proportional thereto nor a constant percentage thereof, and where a large number of items are involved, the mental labor and time consumed in determining the tax becomes both onerous and expensive.

The present invention discloses a means for automatically determining the price or charge and the appropriate tax thereon from data pertinent to the charge. A feature of the invention is a means whereby the tax need not bear a fixed relation to the associated price or charge, but may, in each case, be the appropriate tax regardless of the system of taxation.

One embodiment of the invention disclosed herein by way of illustration is particularly adapted for use in telephone message accounting of so-called AB toll calls which, generally speaking, are calls completed between subscribers in different zonal areas, and in which the pertinent information pertaining to a completed call is noted upon a ticket by the operator who establishes the call. It is the general practice to provide one accounting office for a telephone area comprising a plurality of zones each including a plurality of telephone exchanges. To this accounting office are forwarded at the end of each billing period all the toll tickets accumulated in each of the exchanges in the different zones of the area, and the charge and the tax for each call are there computed by correlating from prepared tables the information contained on the ticket, that is, the code of the called exchange, the code of the zone in which the calling exchange is located, the time of conversation and the class of service to which the calling subscriber is entitled or otherwise requested at the time the call was established.

In accordance with the present invention it is proposed to perform all this labor automatically by providing the operator at the accounting office (or elsewhere) with a keyboard or other suitable equipment on which the items of information contained on the toll ticket prepared for the call are registered. Apparatus responsive to the registration of the above items of information then operates to select a particular device individual to the charge and tax pertaining to that call, which device is operated as a determinant of the charge and tax, and may be used, when so operated, to control any suitable indicating or recording apparatus to display or record said charge and tax.

The above and other features of the invention will be more readily understood from the following description, the appended claims and the drawings in which:

Fig. 7 shows a charge-code translator and a typical charge relay; while

Fig. 8 shows the manner in which Figs. 1 to 7, inclusive, should be arranged in order to completely disclose the invention.

We will first describe the general arrangement of the circuit network of the invention and the significance of certain of its elements, and we will then describe its operation in detail with reference to the determination of the charge and tax for a particular call.

Figure 1:
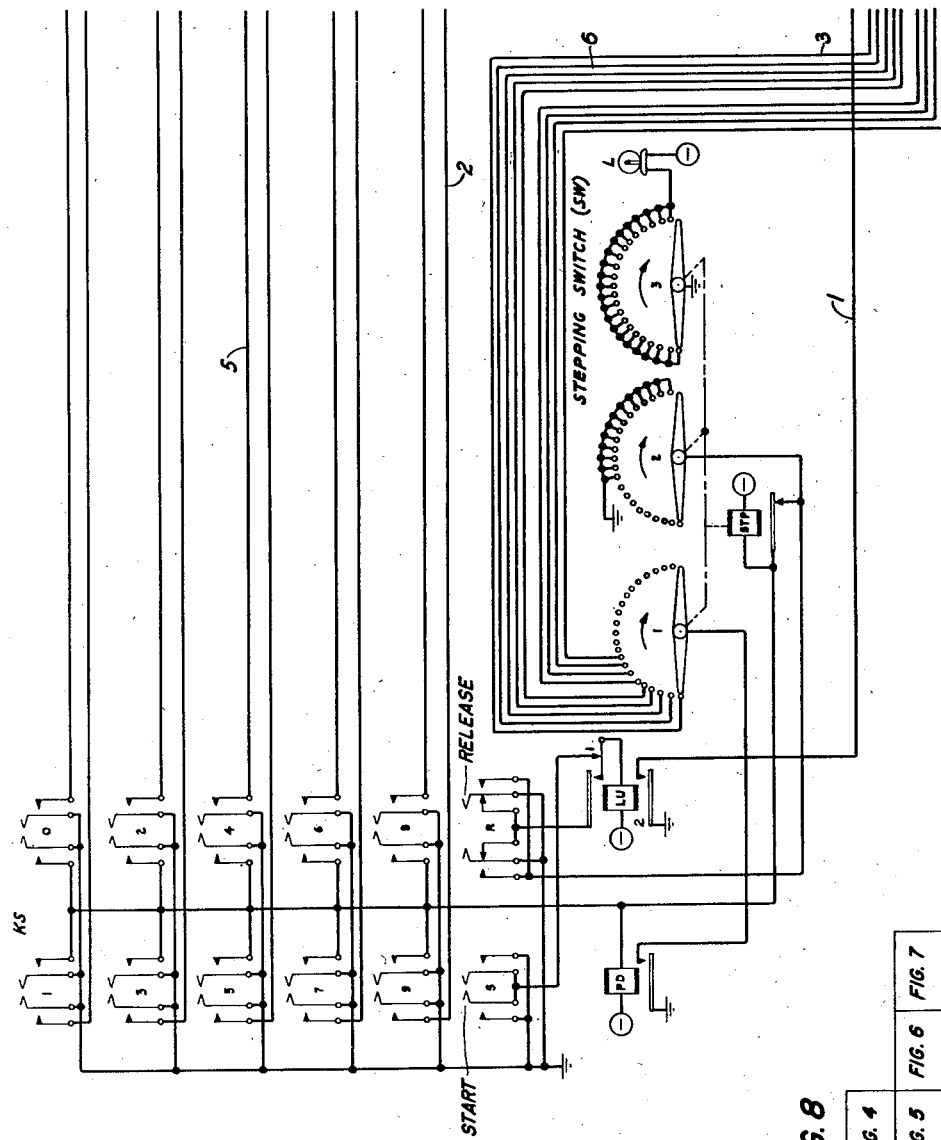
Fig. 1 shows the key-set and a steering switch.
Figure 2:
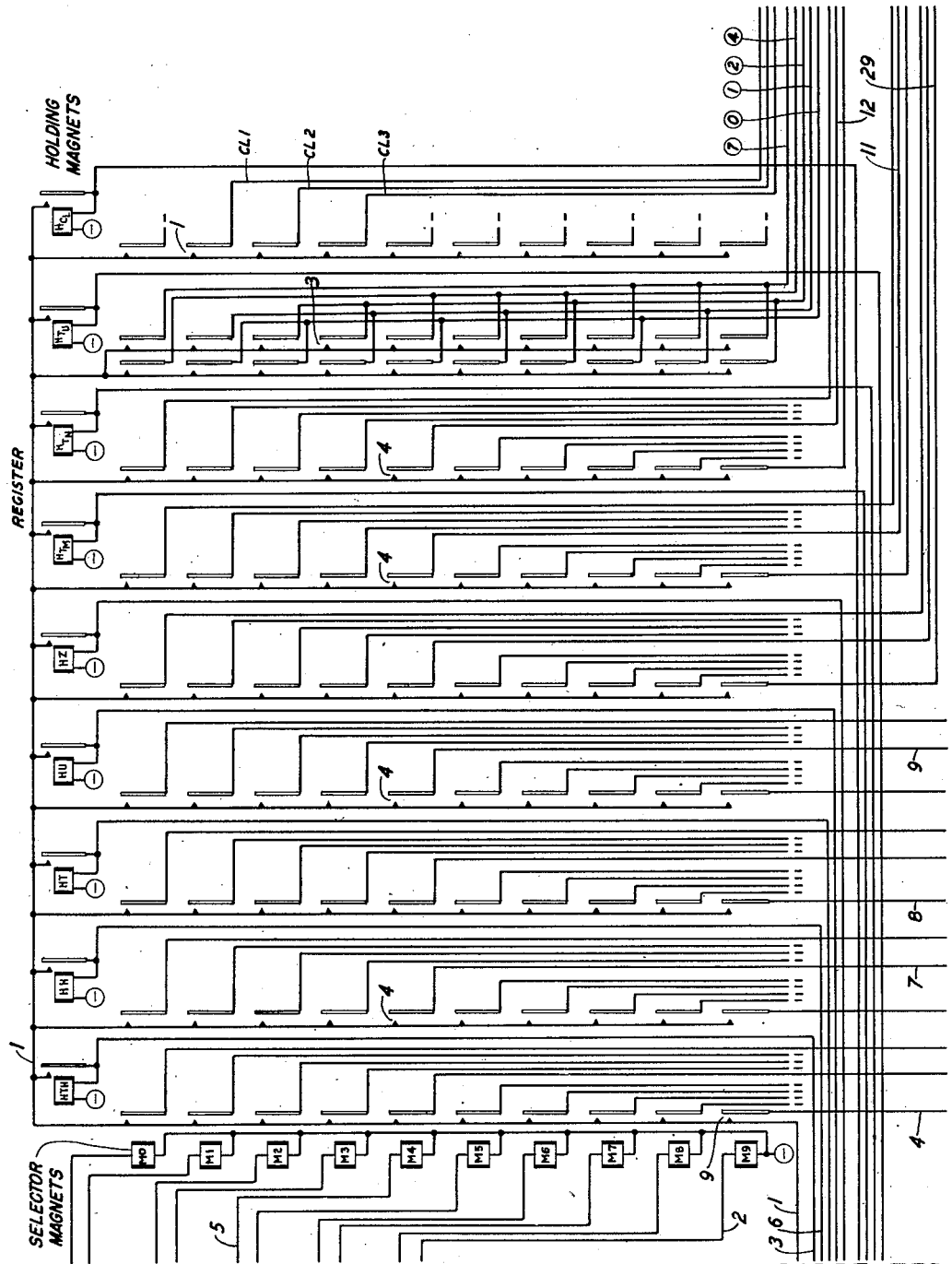
Fig. 2 shows a cross-bar switch.

Referring, now, to the drawings, Fig. 1 shows a key-set KS for use by the operator in registering the items of information pertaining to a call for which the charge and tax is to be determined. The key-set is provided with ten non-locking keys designated 0 to 9, a non-locking release key R and a non-locking start key S. Associated with the key-set KS are two auxiliary relays LU and a PD and steering or stepping switch SW of well-known construction, the function of the latter being to extend certain common conductors activated by the sequential operation of the digit keys progressively to other conductors extending to the magnets of the cross-bar switch shown in Fig. 2. The latter switch, a typical example of which is shown in Patent No. 2,021,329 except as slightly modified in construction for the use of this invention as subsequently described, comprises ten select magnets M0 to M9 and ten hold magnets HTH to HCL, inclusive. In the operation of the cross-bar switch, the energization of any one of the select magnets M- conditions for closing the array of ten horizontal cross-points aligned with the operated select magnet. When, subsequent to the operation of said magnet, one of the hold magnets HTH to HCL is operated, the particular cross-point at the intersection determined by the horizontal row of cross-points aligned with the operated select magnet and the vertical column of cross-points aligned with the operated hold magnet is closed for use, and such cross-point will then remain closed after the release of the select magnet so long as the hold magnet remains operated. It is obvious that by successive operation of the same or different select magnets, each followed by the operation of a different hold magnet, will result in the closure of the cross-points severally defined by the intersection of the horizontal row and vertical column of cross-points marked by an operated pair of select and hold magnets, said cross-points remaining closed as long as the involved hold magnets are maintained in an operated position.

Figure 3:
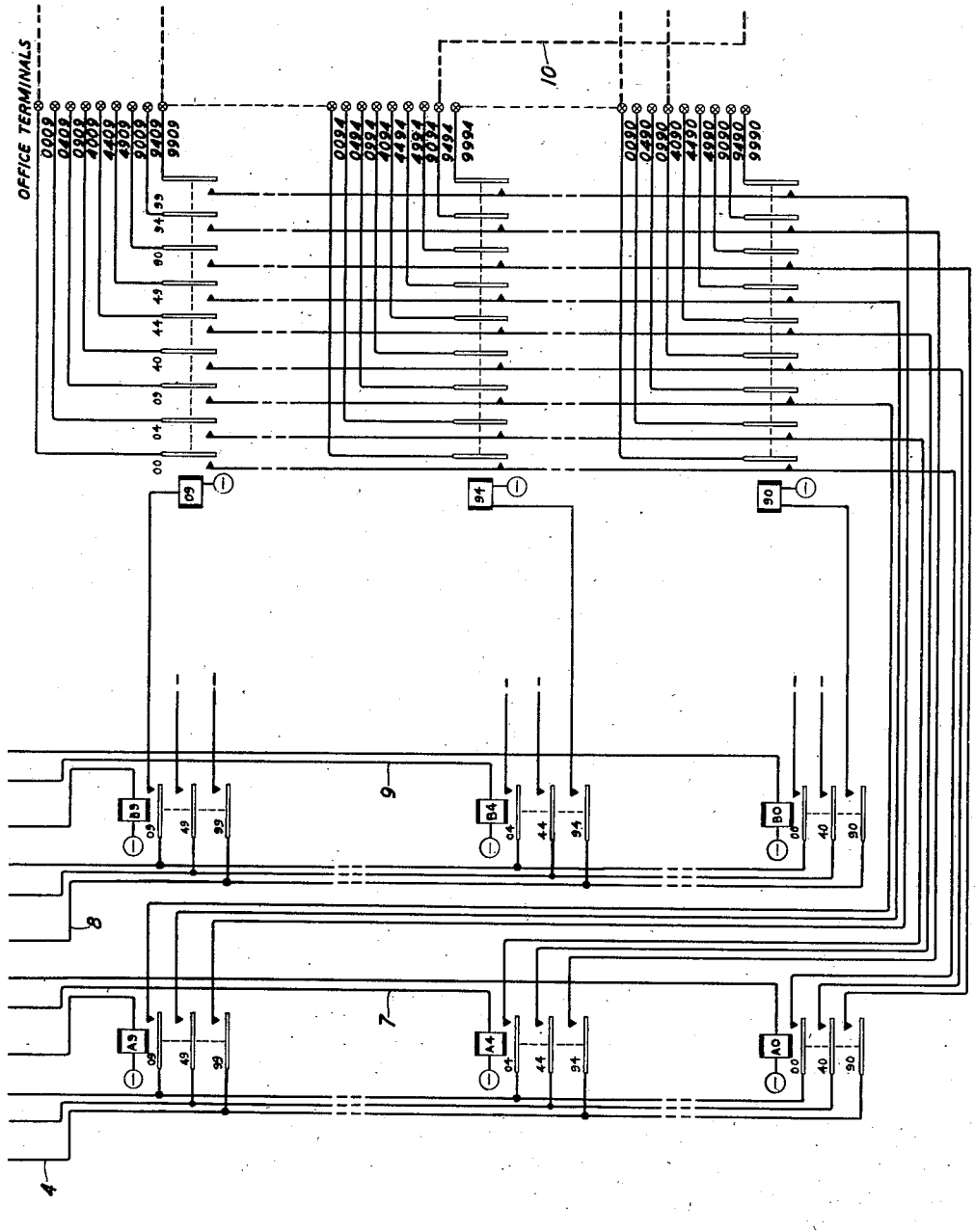
Fig. 3 shows relays which are selectively settable from the cross-bar switch, and certain other relays which are selectively operable from said first-mentioned relays.

In Fig. 3 are shown three groups of relays, the first group being the ten relays A0 to A9 each having ten pairs of contacts designated in the manner shown, a second group of ten relays B0 to B9 each also having ten pairs of contacts designated as shown, and a third group of one hundred relays designated 00 to 99 (of which only relays 09, 94 and 90 are shown) the windings of which are severally wired to the resting contacts of the ten relays B0 to B9 in such a manner that each relay 00 . . . 99 is connected to that pair of contacts on a relay B0 . . . B9 which bears the same numerical designation as itself. For example, relay 09 is connected to the resting contact of the pair of contacts 09 on relay B9, relay 94 is connected to the resting contact of the pair of contacts 94 on relay B4, while relay 90 is connected to the resting contact of the pair of contacts 90 on relay B0. Each of the one hundred relays 00 . . . 99 is provided with a group of one hundred pairs of contacts designated as shown for relay 09, the armatures of each of which are individually extended to cross-connecting terminals, while the corresponding resting contacts on each of the relays are multiplied and extended to the resting contacts of the ten relays A0 to A9, the wiring being such that corresponding resting contacts on the hundred relays 00 . . . 99 are extended to the resting contacts of identically designated pair of contacts on the relays A0 . . . A9. For example, the resting contacts of the pairs of contacts 09 on the relays 00 to 99 are extended to the resting contact of the pair of contacts 09 on relay A9, the resting contacts of the pairs of contacts 44 on said relays 00 . . . 99 are extended to the resting contact of the pair of contacts 44 on relay A4. The resting contacts on the pairs of contacts on said relays 00 . . . 99 are similarly extended to the resting contacts of the pairs of contacts on relays A0 . . . A9.

It will thus be seen from an inspection of Fig. 3 that since one hundred relays 00 to 99 are provided, each having one hundred pairs of contacts with the armature of each pair brought out and connected to a cross-connecting terminal, ten thousand such terminals are provided, namely from terminal 0000 to terminal 9999 as shown in the column of terminals designated "Office terminals." It will further be observed that the first two digits of each terminal designation correspond to the two-digital designation of the pair of contacts on the one relay 00 . . . 99 to the armature of which the terminal is cross-connected, while the last two digits correspond to the two-digital designation of said one relay. As described later, the wiring arrangement between the three groups of relays A0 . . . A9, B0 . . . B9 and relay 00 . . . 99 is such that a four-digit number registered on the cross-points of the cross-bar switch will cause the selective operation of a relay in each group and the electrical activation of the one conductor connected to the terminal having a designation corresponding to the registered number, so that if, for example, the number 9494 is registered on the cross-points of the switch, the conductor connected to terminal 9494 will be electrically activated.

The ten thousand terminals 0000 to 9999 represent the maximum number of telephone exchanges in the area serviced by the accounting office for which the present embodiment of the invention is adapted. It is obvious, of course, that the area can be expanded to include more exchanges if necessary, and that the facilities of the present invention may be expanded to serve such exchanges by the use of additional switching units and relays or their equivalents.

Figure 4:
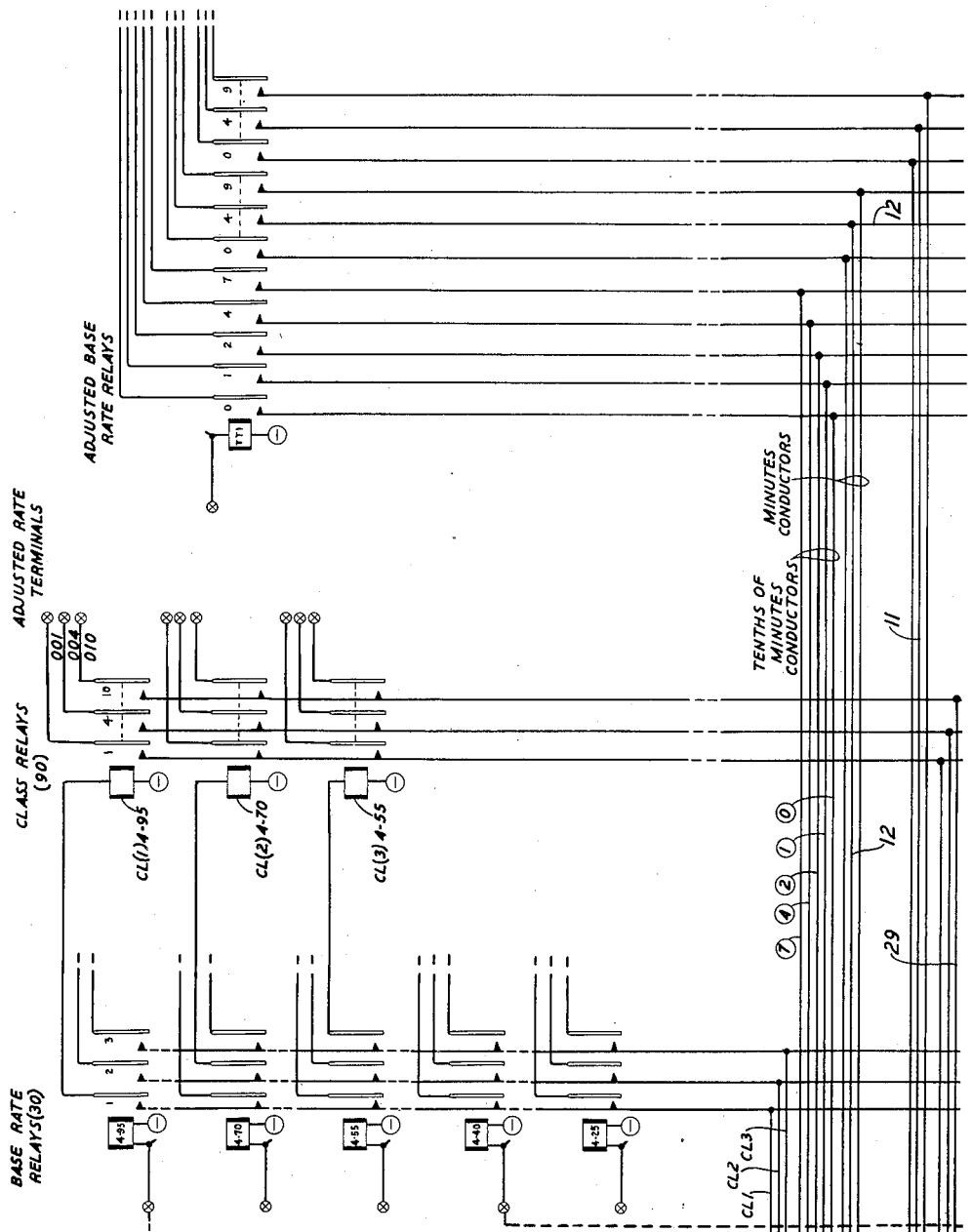
Figs. 4 and 5 show the Base Rate relays, the Class relays and the Adjusted Base Rate relays.
Figure 5:
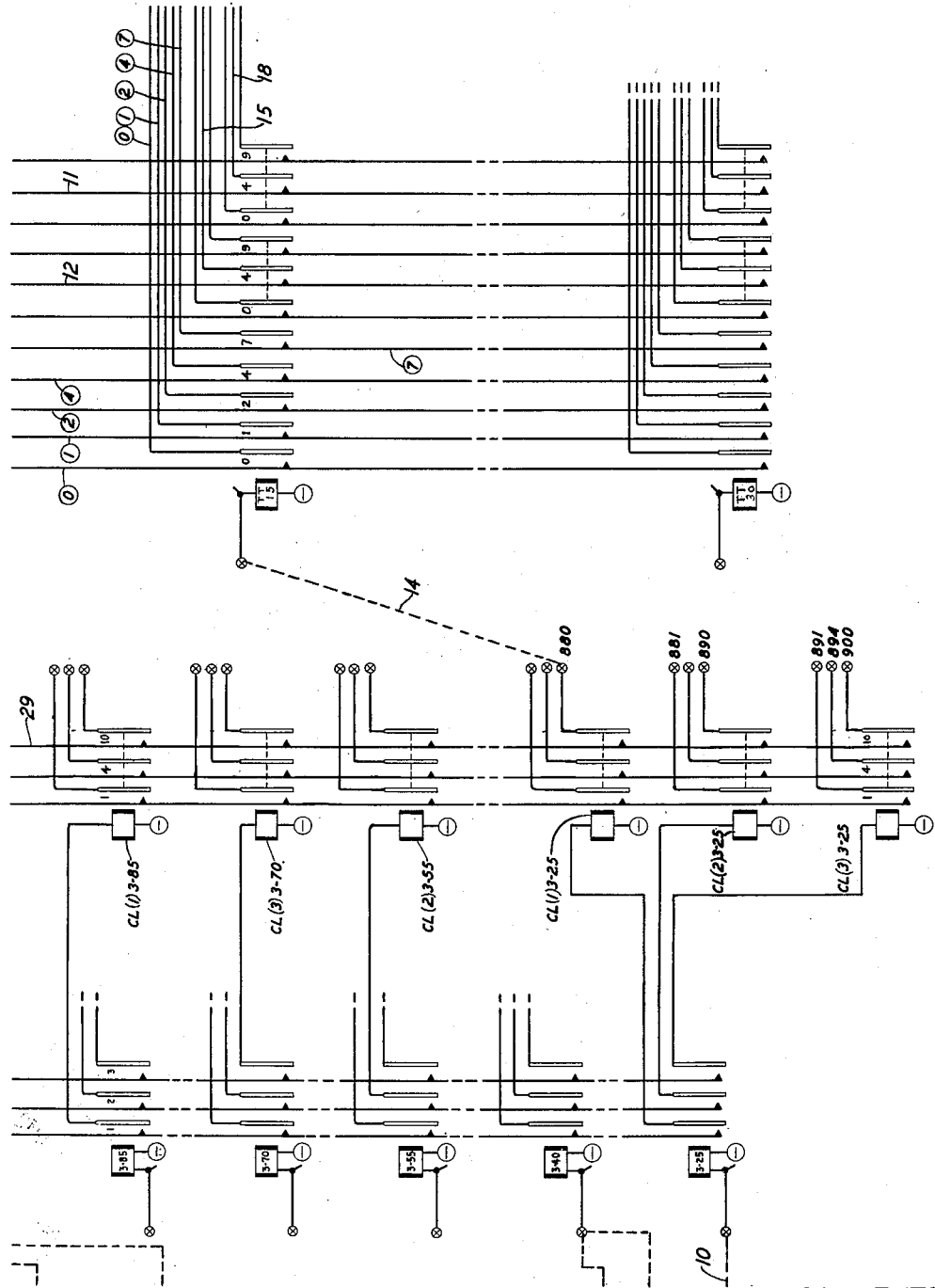

Figs. 4 and 5, taken together, show three groups of relays. The first group at the extreme left, designated Base Rate relays, comprises thirty relays of which only ten are shown, each bearing a functional designation indicating a period of time and a charge therefor. Thus relay 3—25 at the bottom of the group indicates an initial charge of twenty-five cents for an initial three minutes of conversation, while relay 4—95 at the top of the group indicates an initial charge of ninety-five cents for an initial four minutes of conversation. The intermediate relays (including those not shown on the drawing) bear designations indicating five cent increments to the charge for a three or four-minute interval of conversation, as the case may be.

The Base Rate relays comprise the basic rate structure for the entire area served by the accounting office, and the number of such relays depends upon the number of rates applicable. It is, of course, theoretically possible that, for an area having ten thousand exchanges there could be as many as ten thousand rates. In actual practice, however, the number of rates for such an area is very much smaller than this and, by way of illustration, it is assumed in the present embodiment of the invention that thirty base rates will suffice to illustrate its operation, though the number of such relays may be increased or reduced to suit the particulars of any given rate structure.

The winding of each Base Rate relay is connected by a jumper to whichever office terminal, or terminals, the rate indicated by the designation of the relay applies. Thus, for example, if the initial rate of twenty-five cents for three minutes of conversation applies to the office having the code designation 9494, then relay 3—25 would be connected to terminal 9494 by a jumper 10, as shown. In the same manner each of the other Base Rate relays 3—40—4—95 would be cross-connected by suitable means to whichever called office terminal, or terminals, the rate indicated by the relay designation applies, the drawing showing by way of illustration relay 4—95 connected to terminal 0009, relay 4—40 to terminal 9909 and relay 3—40 to terminals 4090 and 0090.

To the right of the Base Rate relays there is another group of relays called the Class relays. It is obvious, of course, that the rate charged for a particular call is not only dependent upon the initial base rate, but (among other factors) by the class of the call. For example, a "person-to-person" call would be charged for at a higher rate than a "station-to-station" call and a "day rate" for the former class of call would be at a higher rate than that for the latter class. In the present embodiment of the invention the arrangement is limited to a modification of each initial rate by one of three class indications, for which purpose three class relays are provided for each Base Rate relay, the winding of a Class relay being connected to an armature on the associated Base Rate relay. Thus the three class relays CL(1)3—25, CL(2)3—25 and CL(3)3—25 are associated with the Base Rate relay 3—25, the first of said Class relays being connected to the No. 1 armature of relay 3—25, the second to the No. 2 armature and the third to the No. 3 armature. The other Class relays indicated in Figs. 4 and 5 and those not shown in the drawing are similarly connected to their associated Base Rate relays.

Each Class relay is provided with ten pairs of contacts severally designated 1 to 10, corresponding resting contacts of which are multiplied and extended to correspondingly numbered cross-points on the fifth vertical column of cross-points on the cross-bar switch, said cross-point being under the control of hold magnet HZ. Each of the ten armatures on each of the Class relays is brought out to a cross-connecting terminal. In Figs. 4 and 5, all these terminals are shown arranged in a vertical column designated Adjusted Rate terminals, each terminal being numbered from 001 to 900, as indicated. Inasmuch as thirty Base Rate relays are provided in the disclosure, there would be a total of ninety Class relays. Corresponding resting contacts on the Base Rate relays are multiplied and severally connected to three cross-points 1, 2 and 3 on the ninth vertical column of cross-points of the cross-bar switch, controlled by the hold magnet HCL, the object being to complete a circuit path over one of the cross-points for a particular Class relay through the contacts of an associated operated Base Rate relay, as explained hereinafter.

To the right of the Class relays is shown a group of thirty Adjusted Base Rate relays TT1–TT30, the winding of each of which is cross-connected to one or more of the Adjusted Rate terminals in accordance with the rate structure indicated by a class relay, the zone of origin and a Base Rate relay. Thus, for example, the No. 10 armature of the Class relay CL(1)3—25 is shown cross-connected to the winding of Adjusted Base Rate relay TT15 so that upon the operation of said Class relay, relay TT15 will operate to perform functions described hereinafter. Each of the Adjusted Base Rate relays is provided with twenty-five pairs of contacts divided into a first inner group of five pairs of such contacts severally designated 0, 1, 2, 4 and 7, a middle group of ten pairs severally designated 0 to 9 and an outer group of ten pairs also severally designated 0 to 9. Corresponding resting contacts of the inner group in each of the relays are multiplied and extended, respectively, to the vertical column of cross-points controlled by hold magnet HTU; corresponding resting contacts of the middle group in each relay are multiplied and extended, respectively, to the vertical column of cross-points controlled by hold magnet HTN, while corresponding resting contacts of the outer group in each relay are multiplied and extended, respectively, to the vertical column of cross-points controlled by hold magnet HTM. The armatures on each relay TT– extend to a time-decoding circuit shown in Fig. 6 of which one is provided for each Adjusted Base Rate relay TT–, the circuit shown in Fig. 6 being the one associated with relay TT15.

Figure 6:
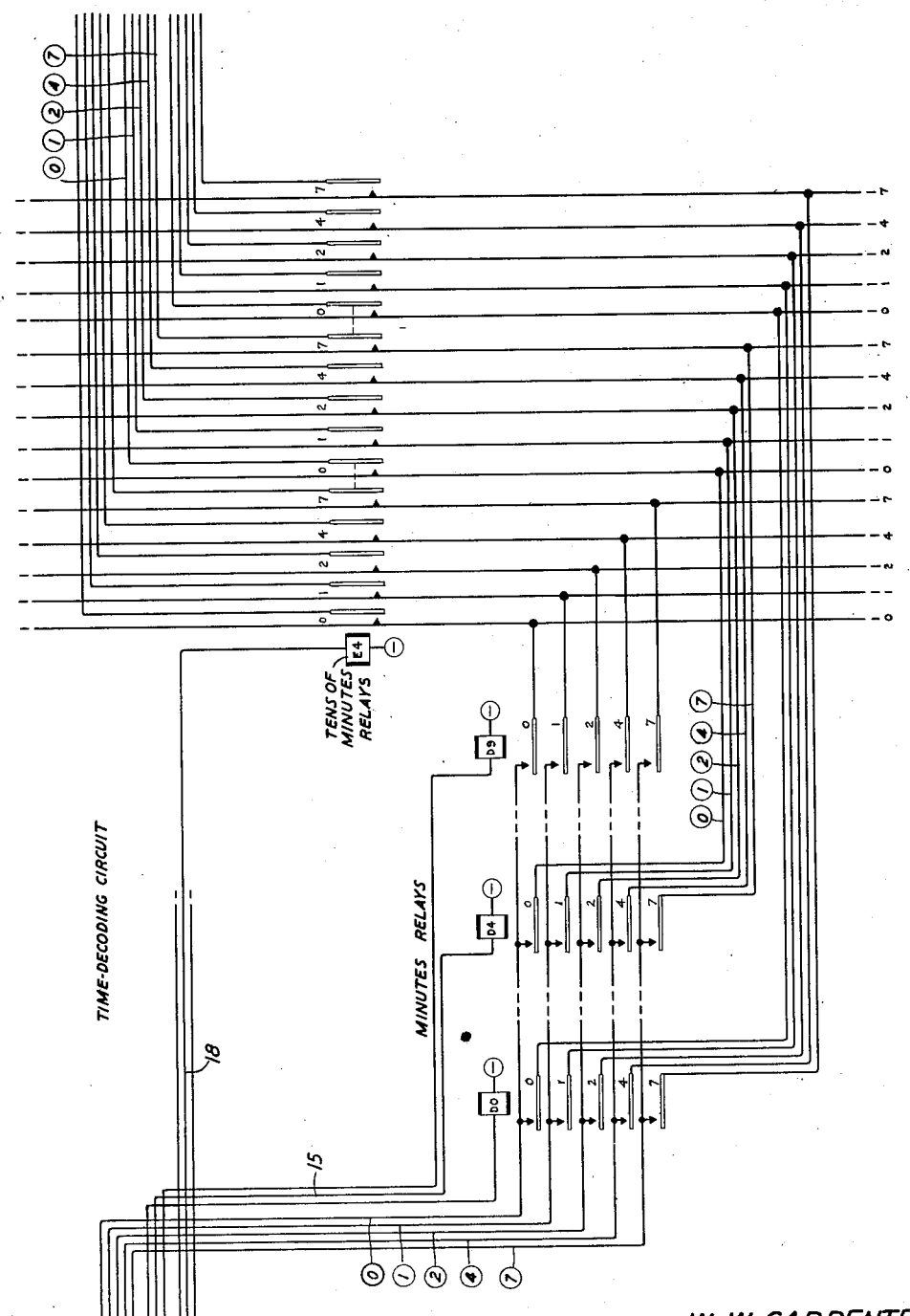
Fig. 6 shows a time-decoding circuit individual to each of the Base Rate relays.

The circuit shown in Fig. 6 is primarily a decoding circuit comprising ten relays E0–E9, each indicating a number of tens of minutes in the conversation period, and a group of ten "minutes" relays D0–D9 each of which registers the number of "units" minutes of elapsed time indicated by the numerical portion of the designation of the relay. Each of the relays D0–D9 is provided with five pairs of contacts 0, 1, 2, 4 and 7, the resting contacts of which are multiplied and extended to similarly designated armatures on the associated relay TT– while the armatures of each of said relays D0–D9 are extended to the resting contacts of a relay E–, the armatures of relay D0 being extended to the outermost group of five similarly designated resting contacts on relay E–, the armatures of relay D1 being extended to the next group, and so on up to and including the armatures of relay D9 which are extended to the innermost group of five similarly designated resting contacts. Inasmuch as there are ten relays D–, each having five pairs of contacts, each relay E– is provided with fifty pairs of contacts. The resting contacts on said relays E– (of which thirty are provided) are multiplied together, while the armatures of each of said relays E– are extended in groups of five to cross-connecting terminals shown on Fig. 7. Thus there is provided a group of fifty cross-connecting terminals for each relay E–, and since thirty such relays are included in the rate structure, there will be a total of fifteen hundred cross-connecting terminals of which the fifty indicated and the fifteen of the fifty shown in Fig. 7, belong to relay E4.

For each group of five terminals in Fig. 7 associated with a relay E– there is provided a group of five charge-decoding relays F0, F1, F2, F4 and F7. These relays are cross-connected to the associated group of five terminals (which are given the same numerical designation as the relays) in accordance with the well-known two-out-of-five code, such that if two of the conductors connected to the terminals in the group are grounded according to the code, the two correspondingly numbered relays F0–F7 are operated to complete a ground path to one of the ten terminals 0–9 shown below the relays. The code, the relays operated, and the terminal grounded are as follows:

| Relays Operated | Terminal Grounded |
|---|---|
| F4, F7 | 0 |
| F0, F1 | 1 |
| F0, F2 | 2 |
| F1, F2 | 3 |
| F0, F4 | 4 |
| F1, F4 | 5 |
| F2, F4 | 6 |
| F0, F7 | 7 |
| F1, F7 | 8 |
| F2, F7 | 9 |

To each of the terminals 0–9 for each group of five relays F0–F7 there is connected a charge relay CH which indicates the charge and the associated tax. It should be observed that since ten terminals are provided for each group of relays F0–F7 and ten such groups of relays are provided for each of the thirty relays E— in the rate structure, the arrangement provides for a maximum of three thousand individual charges and associated taxes, as represented by each of the relays CH. Of course, where different combinations of initial rates, class, zone and periods of conversation yield the same charge, the relay CH representing this charge is cross-connected to each of the terminals in each of the several groups of relays F0–F7 for the thirty relays E— that are assigned to the charge.

Each relay CH is supplied with one group of contacts to indicate the charge and another group of contacts to indicate the tax. The armatures (or the resting contacts) are grounded or otherwise suitably activated electrically while the resting contacts (or the armatures) are extended to a circuit the character of which depends upon the form in which the charge and tax information is desired. If said information is desired visually, for example, the ungrounded contacts may be wired to a suitable lamp bank, the number of contacts provided depending upon the number of digits in which the charge and tax are expressed. On the other hand, if it is desired to make a record of the information, then the ungrounded contacts are selectively extended to the operating elements of any suitable recording circuit such as a teletypewriter, a perforator, etc. For example, if it is desired to record the information by coded perforations (and particularly in the two-out-of-five code) the recorder disclosed in copending application Serial No. 724,992, filed January 29, 1947, now Patent No. 2,558,476, which issued June 26, 1951, may be used. Relay CH would then be provided with two pairs of contacts for each digit of the charge and tax, said contacts being selectively wired to the contacts of a "cut-in" relay (not shown) in accordance with the code. The contacts of the cut-in relay extend to the punch magnets of the recorder and it is obvious that when said cut-in relay is operated, circuits will be completed to selected ones of said magnets from the contacts of the operated relay CH, to perforate on a tape the charge and tax in the two-out-of-five code.

In general, the operation of the invention is as follows.

The operator first operates the start key S and thereafter operates the digit keys of the key-set KS in succession to register nine digits shown on the ticket for the call, of which the first four digits designate the code of the called office, the fifth that of the zone in which the originating office is located, the sixth, seventh and eighth the period of conversation, and the ninth the class of the call. Upon the registration of the first four digits, the cross-bar switch operates to cause the selective operation of one relay in the group of ten relays A0–A9 and one relay in the group of ten relays B0–B9, in consequence of which a circuit is then completed for one of the relays 00–99 over the contacts of the operated relay B—. At the same time ground is also applied through a set of contacts on the operated relay A— and a set of contacts on the operated relay in the group of relays 00–99, to the Office terminal corresponding to the called office code. Inasmuch as each of these terminals is selectively cross-connected to one of the Base Rate relays, the ground on said terminal will complete the circuit of the one Base Rate relay so cross-connected. The next digit key that will be depressed by the operator will be the one which designates the zone, whereupon the cross-bar switch will be operated to apply ground to the one conductor designating this zone which extends to the Adjusted Base Rate relays TT1–TT30. In the same manner, the depression of the next three digits representing the period of conversation will also cause the cross-bar switch to operate and apply ground to certain three conductors which also extend to said Adjusted Base Rate relays. The last digit to be depressed will be that of the class of call, and by this last operation the switch will cause ground to be applied to one of the class leads CL1, CL2 and CL3 by which a particular class relay CL(x) will be operated, whereupon the appropriate Adjusted Base Rate relay TT— is then operated over the grounded zone conductor. The operation of the relay TT— then extends the timing leads to its associated code circuit indicated in Fig. 6, whereupon a relay E— and a relay D— are operated to ground two terminals of a group five in Fig. 7 to cause the operation of two of the five relays F0–F7 individual to said group of five terminals, resulting in the closure of the one circuit for a relay CH specific to the charge and tax for the call whose details, in digit indications, were set up on the digit keys of the key-set KS. When the charge relay CH has operated and the information represented by its contacts is suitably indicated or recorded, the operator depresses release key R, thereby releasing the apparatus for use in selecting the charge and tax for another call.

We will now describe the detailed operation of the circuit. It will be assumed that the nine-digit number to be registered upon the key-set KS is 949494431, in which the first four digits comprising the number 9494 represent the code of the called office, the following digit 9 represents the zone of origin, the next three digits 443 represent a conversation period of forty-four and three-tenths minutes while the last digit 1 represents the class of the call. It will further be assumed that the charge for the call to the office designated by the code 9494 from an office in zone 9 is twenty-five cents for an initial period of three minutes of conversation and five cents for each minute of overtime or fraction thereof over a tenth of a minute, thus making the price of the call $2.35 on which the tax may be assumed to be $0.47.

The operator first operates the start key S thereby to complete a circuit for relay LU, extending from battery through its windings and over its normally made No. 1 contacts, contacts of start keys S to ground. Relay LU operates, locks over its No. 1 make contacts, normal make contacts of release key R to ground and, over its No. 2 contacts, extends ground over conductor 1 to the resting contacts of all the cross-points of the cross-bar switch and to the resting contacts of the nine hold magnets HTH . . . HCL. The operator then depresses the digit key 9, whereupon a circuit is completed from ground over the left contacts of said key, conductor No. 2, winding of select magnet M9 to battery, causing said magnet to operate and condition the ninth horizontal rows of switch cross-points. Another circuit is also completed from ground through the right contacts of digit key 9, winding of relay PD to battery and, in parallel therewith, winding of the step magnet STP to battery. Both relay PD and magnet STP operate, the former completing a circuit from ground on its contacts, switch brush No. 1 and first resting terminal, conductor 3, winding of hold magnet HTH to battery, and the latter operating to condition the switch brushes 1, 2 and 3 to advance to their respective second resting terminals upon the release of the magnet. Hold magnet HTH locks operated to ground on conductor 1 and causes the cross-point No. 9 in the first vertical column of cross-points (reading from left to right) to be closed, and thereby extend ground on said conductor 1 to conductor 4, the latter being connected to an armature in each of the ten relays A0 to A9 having the digit "9" as its tens designation.

When the operator releases the digit key 9, the circuit of select magnet M9 is opened, whereupon this magnet releases though the associated cross-point 9 in the first vertical column of cross-points is held in an operated position by the locked hold magnet HTH. The release of digit key 9 further causes the release of relay PD and magnet STP, the former removing the operate ground from the hold magnet HTH and the latter advancing the brushes of switch SW to their second resting terminals. It will be noted that when brush 3 advances to its second resting terminal, an obvious circuit is completed for lamp L which lights to indicate the abnormal condition of the switch.

The operator now operates digit key 4 to register the second digit, thereby completing a circuit from ground over the right contacts of digit key 4, conductor No. 5, winding of select magnet M4 to battery, and another circuit from ground through the left contacts of said key, winding of relay PD to battery, and winding of magnet STP to battery. Select magnet M4 operates to condition the fourth horizontal row of cross-points, magnet STP operates to condition the brush wipers 1, 2 and 3 of switch SW to advance to their respective third resting terminals on the release of the magnet, while relay PD operates to supply ground on its contacts to brush 1, thereby to complete a circuit over said brush and its second resting terminal, conductor 6, winding of hold magnet HH to battery. Hold magnet HH operates and locks over its contacts to aforesaid ground on conductor 1, thereby to close the No. 4 cross-point in the second vertical column of cross-points, said locking ground further completing a circuit over said operated cross-point and conductor 7, winding of relay A4 to battery, causing said relay to operate. The release of the digit key 4 will cause the release of relay PD and magnet STP, the former to open the circuit of select magnet M4 which releases and the latter to advance the brush wipers 1, 2 and 3 to their third resting terminals.

Thus the operation of the digit key 9 has resulted in the application of ground to conductor 4 and, therefore, to the armatures of all relays A0 ... A9 designated by the numeral 9 in the tens position of the designation, while the operation of the second digit key 4 has resulted in the operation of relay A4. In the same manner, the operation of the digit key 9 for the third digit will cause the closing of the ninth cross-point in the third vertical column of cross-points and the application of ground to conductor 8 and the armatures of relays B0 ... B9 having the numeral 9 in the tens digit of their respective designations, while the operation of the digit key 4 for the fourth digit will cause the closing of the fourth cross-point in the fourth vertical column of cross-points and the completion of a circuit for relay B4 over conductor 9. In the case of the second operation of the digit key 9, hold magnet HT is operated and locked while in the case of the second operation of digit key 4, hold magnet HU is operated and locked. The first four digits 9494 registered in succession on the key-set KS are thus registered as a number 9494 by the grounding of conductor 4 (for the thousands digit 9), the operation of relay A4 (for the hundreds digit 4) the grounding of conductor 8 (for the tens digit 9) and the operation of relay B4 (for the units digit 4).

As a result of the operation of relay B4 and the application of ground to conductor 8, a circuit is completed for relay 94 extending from battery through the winding of said relay, contacts 94 on relay B4, to ground on conductor 8. Relay 94 operates and a ground path is thereby completed from ground on conductor 4, No. 94 contacts of relay A4, No. 94 contacts of relay 94 to office terminal 9494.

It has been previously stated that the base rate for a call to the office indicated by the called office code 9494 is twenty-five cents for the first three minutes of conversation. Upon this assumption, the winding of Base Rate relay 3—35 is cross-connected by way of jumper 10 to terminal 9494, and since the latter terminal is grounded as previously described, an obvious circuit is completed for relay 3—25 which operates.

The next digit to be registered in the key-set KS will be the digit 9. As previously indicated, this digit connotes the zone in which the calling office is located. By the operation of digit key 9 as the fifth digit to be registered, select magnet M9 is caused to be operated over a circuit similar to the one previously described for this magnet, and hold magnet HZ is also operated and locked in the same manner as the hold magnets HTH and HH were previously operated and locked, whereupon the ground on conductor 1 which locks hold magnet HZ is also applied over the closed No. 9 cross-point in the fifth vertical column of cross-points to conductor 29 which, at the present time, however, performs no useful function.

The next three digits to be registered in succession are 443, indicating a period of conversation of forty-four and three-tenths minutes. The operation of the digit key 4 causes the operation of select magnet M4 and the operation and locking of hold magnet HTM in the manner previously described, whereupon the ground on conductor 1 which locks hold magnet HTM is applied over the No. 4 cross-point in the sixth vertical column of cross-points to conductor 11. In the same manner, the next operation of digit key 4 will cause the operation of select magnet M4 and the operation and locking of hold magnet HTM, whereupon ground will be applied over the No. 4 cross-point in the seventh vertical column of cross-points to conductor 12. When the digit key 3 is operated to register the three-tenths minute, select magnet M3 is operated and the hold magnet HTU is operated and locked.

At this point, it will be observed that the eighth vertical column of cross-points controlled by the hold magnet HTU, unlike the previous columns of cross-points, comprises two pairs of contacts for each cross-point. This structural modification of the cross-bar switch for the purposes of the present invention is made to save apparatus, in that the registration of the fractional minute of the conversation period can be made for each fractional unit in the 2-out-of-5 code, previously given, which, as noted hereinafter, results in the use of less heavily loaded relays D0 ... D9 for each of the time-recording circuits represented by Fig. 6 and the use of five relays F0 ... F7 instead of ten in each of the charge-decoding circuits represented by Fig. 7. The conductors 0, 1, 2, 4 and 7 (each enclosed in a circle) are wired to each of the pairs of contacts at each of the cross-points in the eighth vertical column to represent the involved digit in the 2-out-of-5 code as follows:

| Conductors | Digit |
|---|---|
| 4, 7 | 0 |
| 0, 1 | 1 |
| 0, 2 | 2 |
| 1, 2 | 3 |
| 0, 4 | 4 |
| 4, 1 | 5 |
| 4, 2 | 6 |
| 0, 7 | 7 |
| 1, 7 | 8 |
| 2, 7 | 9 |

It will be noted from the above code table that code conductors 2 and 1 are wired to the No. 3 cross-points in the eighth vertical column. Since the digit 3 was registered in the key-set KS, this cross-point is operated, whereupon aforetraced ground on conductor 1 is applied through the cross-point contacts to code conductors 1 and 2.

The last digit to be registered on the key-set KS is the class digit 1. In the present embodiment of the invention it is assumed that three classes of calls only are involved and that said classes are indicated as class 1, class 2 or class 3. Therefore when the digit key 1 is operated and select magnet M1 and hold magnet HCL are operated in consequence thereof in the same manner as previously described for other select and hold magnets, the No. 1 cross-point in the ninth vertical column of cross-points is operated, whereupon ground on conductor 1 is extended to conductor CL1. It will now be recalled that the Base Rate relay 3—25 was previously operated by a ground on terminal 9494 and that, as previously noted, relay 3—25 as well as all the other Base Rate relays each have connected to each of their armatures a relay that modifies the base rate in accordance with the class. Since class relay CL(1)3—25 is connected to the No. 1 armature of relay 3—25 and since ground is applied to conductor CL1 as previously noted, a circuit is therefore completed from ground on said conductor, over the No. 1 contacts of relay 3—25, winding of relay CL(1)3—25 to battery, causing said latter relay to operate.

Also as previously explained and as shown in Figs. 4 and 5, thirty Base Rate relays are provided in the present embodiment of the invention. Since for the purpose of illustration the entire rate structure is based upon the existence of three classes of calls, only three class relays are provided for each Base Rate relay, each controlled over a separate pair of contacts. It was further previously explained that each class relay is provided with ten pairs of contacts, the resting contacts of each being all multiplied together and connected to the zone vertical column of cross-points while the corresponding armatures are extended to the Adjusted Rate terminals 001 ... 900. Consequently when relay CL(1)3—25 is operated, and remembering that the depression of the digit key 9 to register the zone 9 resulted in the application of ground to conductor 29, the operation of said relay CL(1)3—25 causes ground on said conductor 29 to be extended over the No. 10 contacts of relay CL(1)3—25 to the Adjusted Rate terminal 880.

The Adjusted Rate terminals are cross-connected to the thirty Adjusted Base Rate relays TT1 ... TT30 in accordance with the zone of origin. It may be assumed as an illustration that the determination of the charge and tax for the call being described requires that the Adjusted Base Rate relay TT15 be cross-connected to Adjusted Rate terminal 880, in consequence of which a circuit is completed for relay TT15 extending from said ground on conductor 29, No. 10 contacts of relay CL(1)3—25, the jumper No. 14, winding of relay TT15 to battery, causing said relay to operate.

Each of the thirty Adjusted Base Rate relays TT1 ... TT30 is provided with twenty-five pairs of contacts which, as previously described, extend to a time-decoding circuit of the kind shown in Fig. 6 and of which one such circuit is provided for each Adjusted Base Rate relay TT–. Since all of the resting contacts of the first group of five pairs of contacts on all relays TT– are strapped together and selectively connected according to code to the eighth vertical column of cross-points as above described, and since the closure of the No. 3 cross-point on this column of cross-points has resulted in the application of ground to the two code conductors 1 and 2, the operation of relay TT15 causes the ground on said two code conductors to be applied over the extensions thereof to the No. 1 and No. 2 resting contacts of relay D0 ... D9 via the No. 1 and No. 2 contacts, respectively, of the first group of five pairs of contacts on relay TT15.

It will further be recalled that the ten conductors connected to the seventh vertical column of cross-points are connected to the multiplied ten resting contacts of the next ten pairs of contacts on the relays TT1 ... TT30. The associated armatures in this group on each of the relays TT– extend to the windings of the ten relays D0 ... D9 for each one of such relays. Since the depression of the digit key 4 for the registration of the "units" minutes of conversation resulted in the closure of the No. 4 cross-point in the seventh vertical column of cross-points, ground on conductor 1 completes a circuit for relay D4 of the group of relays D0 ... D9 associated with relay TT15, said circuit being traced from ground on said conductor, No. 4 cross-point in the seventh vertical column of cross-points, conductor 12, No. 4 contacts in the first group of ten pairs of contacts on relay TT15, conductor 15, winding of relay D4 to battery. Relay D4 operates over this circuit.

Further, the ten cross-points in the sixth vertical column of cross-points are connected to the multiplied ten resting contacts of the outermost ten pairs of contacts of the relays TT1 ... TT30, the armatures of each of which extend to the windings of ten relays E0 ... E9 of which one group is provided for each relay TT–. Since the depression of the digit key 4 to register the number of ten-minute intervals of the assumed period of conversation of 44.3 minutes resulted in the closure of the No. 4 cross-point in the sixth vertical column of cross-points, ground on conductor 1 completes a circuit for relay E4 of the group of relays E0 ... E10 associated with relay TT15, said circuit being traced from ground on said conductor, No. 4 cross-point in the sixth vertical column of cross-points, conductor 11, No. 4 contacts in the outermost group of ten pairs of contacts on relay TT15, conductor 18, winding of relay E4 to battery. Relay E4 operated in this circuit.

Thus the registration of 44.3 minutes as the period of conversation for the call completed to office 9494 from a calling office in zone 9, results in the operation of relay E4 for the ten-minute intervals of the period, relay D4 for the minutes subdivision of a ten minute interval and the application of ground to the two code conductors 1 and 2 for the three-tenths of a minute. Ground on the code conductors 1 and 2 are caused to be extended by the operation of relays D4 and E4 to the two terminals in the group of five terminals in Fig. 7 which are connected by similarly designated code conductors to the five armatures on relay E4 which connect with the armatures of relay D4. As previously explained, there is provided a group of five decoding relays F0 . . . F7 for each group of five such terminals, and their respective windings are cross-connected to said terminals in the 2-out-of-5 code to indicate, by the operation of the two relays connected to the two grounded code conductors, the particular digit connoted by the grounded code conductors. The contacts of the relays F0 . . . F7 are so wired that the operation of any two according to the code will ground a terminal indicative of the code digit. Since code conductors 1 and 2 are grounded as previously described, relays F1 and F2 are operated over obvious circuits, to complete a ground path to terminal No. 3 over a path extending from ground over the No. 1 contacts of relay F1, No. 3 contacts of relay F2 to terminal No. 3.

As previously described, each of the terminals 0 . . . 9 below the relays F0 . . . F7 in Fig. 7 represents a charge and tax, there being one group of such terminals for each set of five decoding relays F0 . . . F7; terminal No. 3 representing the charge and tax ($2.35 for the charge and $0.47 for the tax) for the call completed to the called office designated by the code 9494 from an office in zone 9, class of service 1 and lasting 44.3 minutes which was registered on the key-set KS. To this terminal, to other terminals associated with the one group of relays F0 . . . F7 and all other groups of similar relays associated with other groups of relays representing calls for which the charge and tax are $2.35 and $0.47 respectively, a charge relay CH is cross-connected, and it is obvious that ground on terminal No. 3 will cause the operation of said relay to indicate the charge and tax for the call. On the contacts of relay CH are disposed, as shown, one group of contacts for the charge and another group of contacts for the tax, and these contacts are wired to any suitable indicating or recording circuit in accordance with the disposition which is to be made of the information supplied by the operated relay. Thus, for example, if it is desired to perforate the charge of $2.35 and tax of $0.47 in the 2-out-of-5 code on a medium controlled by the perforating apparatus shown and described in the above-mentioned copending application Serial No. 724,992, filed January 14, 1947, relay CH is provided with three pairs of contacts for the "charge," to which are connected code conductors extending to the contacts of a "cut-in" relay (operated over contacts X) that connects with the perforating magnets of the perforator, certain of said magnets are then operated to perforate holes in the medium indicative of $2.35 in the 2-out-of-5 code. Another group of three contacts is provided and wired for the "tax," which cause certain other magnets to record 74 in said code.

When the charge and tax are thus recorded as above representatively described, the apparatus may be restored to normal by the operation of release key R. At this time the brush wipers of switch SW will have been advanced to their respective tenth resting terminals. The operation of the release key R opens the circuit of relay LU which releases to disconnect ground from conductor 1, thereby releasing the holding magnets of the switch. On releasing, said magnets open the operated cross-points, thereby releasing all relays in the rate structure network. The key R further completes a self-interrupting circuit for switch magnet STP which operates to drive the brush wipers 1, 2 and 3 back to their respective normal resting terminals. In the event that the key is restored before the brushes are homed, a supplementary driving circuit is provided over the terminals swept over by brush 2 until the latter is advanced to the first terminal. The circuit of lamp L is then opened, extinguishing the lamp and thereby indicating to the operator that the apparatus is ready for another charge and tax determination.

While we have illustrated my invention in this application to a particular type of circuit, it is not limited to such application nor to the specific arrangements disclosed herein. It will be evident to one skilled in the art that many applications, arrangements and modifications other than those herein disclosed are within the scope of the invention.

Further, the terms and expressions which we have used in reference to the invention and its elements are used as terms of description and not of limitation, and we have no intention by the use of said terms and expressions of including thereby equivalents of the features shown and described or portions thereof, but on the contrary, intend to include therein any and all equivalents and modifications which may be employed without departing from the spirit of the invention.

What is claimed is:

A system for determining the charge for a telephone call and the tax thereon, said charge being a function of a base rate factor, a called office factor, a class-of-service factor, an overtime factor and a zone of origin factor, comprising a relay for each charge and tax as determined by one or more of said factors, a plurality of base rate relays, an office register, a plurality of class relays selectively operable over said base rate relays, a plurality of adjusted rate relays selectively operable over said class relays, a time decoding register, a key-set, a cross-bar switch operable from said key-set when operated in accordance with each of said factors to close cross-points thereon indicative of each of said factors, means effective upon the operation of said cross-points to operate said office register to register therein the called office code, means responsive to the setting of said register for operating the base rate relay applicable to the call, means controlled over said operated base rate relay for operating a class relay from the closed cross-point on said cross-bar switch indicating the class of call, means responsive to the operation of said class relay for operating an adjusted relay from the closed cross-point on said cross-bar switch indicating the zone factor, means responsive to the operation of said adjusted rate relay for operating said time-decoding register from the closed crosspoints on the switch indicating the time factor, and means responsive to the operation of said time-decoding register for completing the circuit of the relay individual to the charge for the call thereby to operate said relay and thereby determine the charge and tax for the call.

WARREN W. CARPENTER.
EDWARD VROOM.

REFERENCES CITED

The following references are of record in the file of this patent:

UNITED STATES PATENTS

| Number | Name | Date |
|---|---|---|
| 2,385,007 | Leathers et al. | Sept. 18, 1945 |
| 2,386,482 | Leathers et al. | Oct. 9, 1945 |
| 2,434,500 | Leathers et al. | Jan. 13, 1948 |
| 2,477,722 | Coe et al. | Aug. 2, 1949 |